Figure 3:
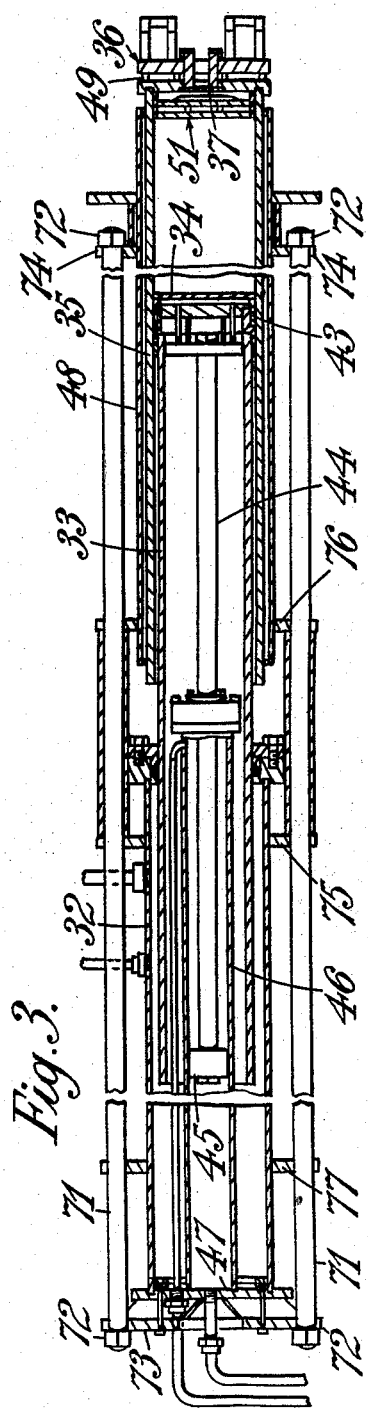

Nov. 1, 1960   J. H. BARWELL ET AL   2,958,098
METHODS AND APPARATUS FOR USE IN THE
REMOULDING OF PNEUMATIC TYRES
Filed Sept. 20, 1955   6 Sheets-Sheet 1
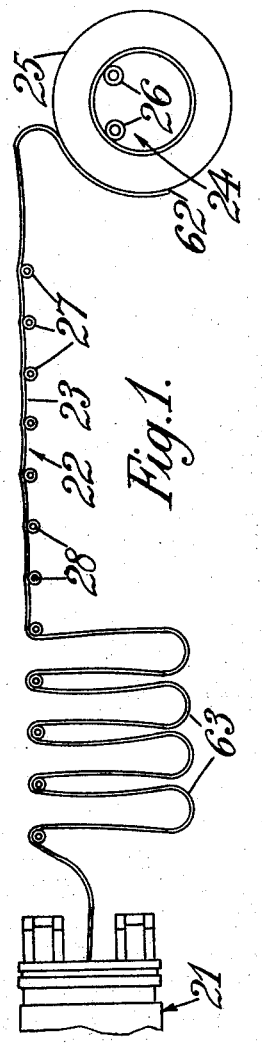
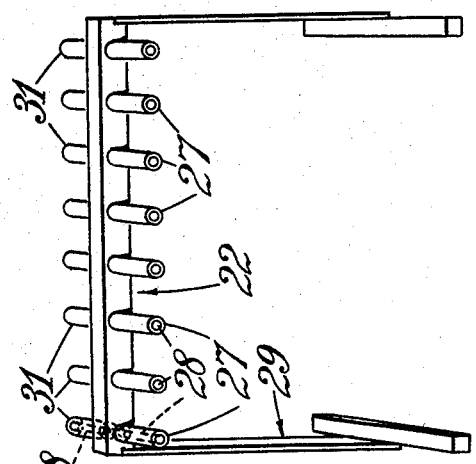
INVENTORS
JOHN H. BARWELL
DONALD J. LANHAM
By Watson, Cole, Grindle & Watson
ATTORNEYS INVENTORS
JOHN H. BARWELL
DONALD J. LANHAM
By
ATTORNEYS Nov. 1, 1960 J. H. BARWELL ET AL 2,958,098
METHODS AND APPARATUS FOR USE IN THE
REMOULDING OF PNEUMATIC TYRES
Filed Sept. 20, 1955 6 Sheets-Sheet 4

INVENTORS
JOHN H. BARWELL
DONALD J. LANHAM
By Watson, Cole, Grindle & Watson
ATTORNEYS

INVENTORS
JOHN H. BARWELL
DONALD J. LANHAM

By Watson, Cole, Grindle & Watson
ATTORNEYS

Nov. 1, 1960 J. H. BARWELL ET AL 2,958,098
METHODS AND APPARATUS FOR USE IN THE
REMOULDING OF PNEUMATIC TYRES
Filed Sept. 20, 1955 6 Sheets-Sheet 6
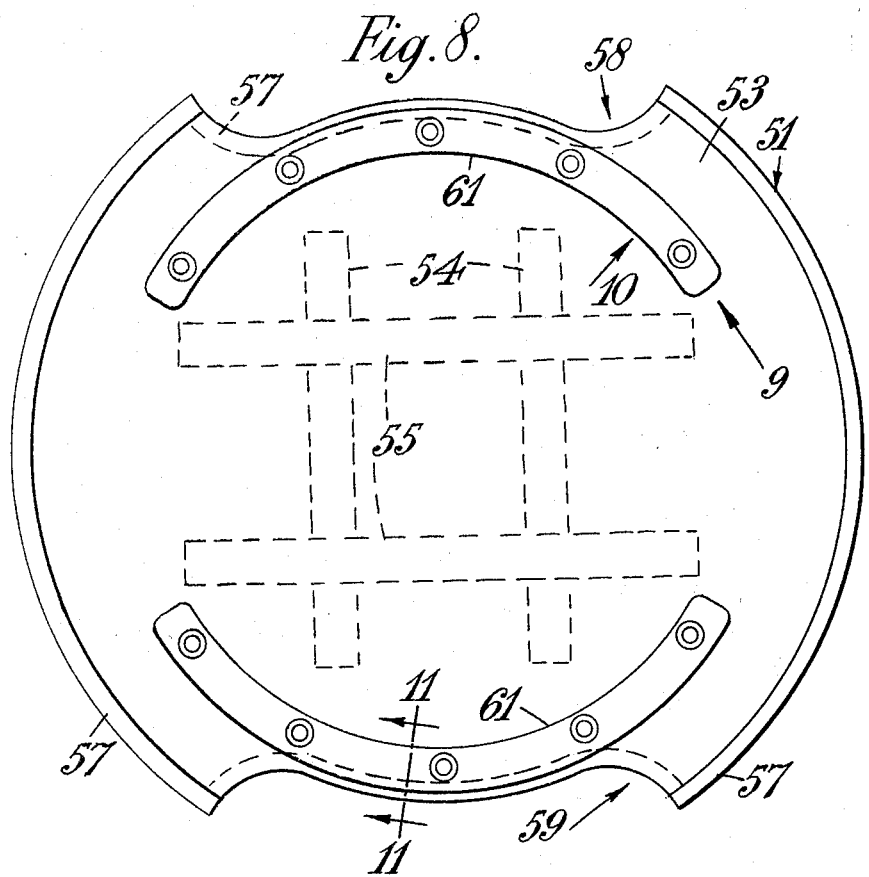
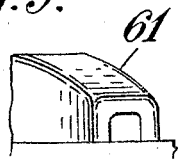
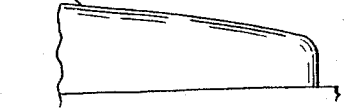
INVENTORS
JOHN H. BARWELL
DONALD J. LANHAM
Watson, Cole, Grindle & Watson
ATTORNEYS United States Patent Office 2,958,098
Patented Nov. 1, 1960

2,958,098

METHODS AND APPARATUS FOR USE IN THE REMOULDING OF PNEUMATIC TYRES

John Harold Barwell and Donald James Lanham, Cambridge, England, assignors to Barwell Rubber Company Limited, Cambridge, England, a British company Filed Sept. 20, 1955, Ser. No. 535,314

Claims priority, application Great Britain Sept. 22, 1954

2 Claims. (Cl. 18—12)

This invention relates to the art of remoulding or retreading pneumatic tyres. The remoulding operation usually involves the following steps:

The old tyre is first stripped, wholly or in part, of its rubber tread, a vulcanising rubber cement is applied over the prepared surface, and there is then applied to the coated surface a tread-forming strip—known as camelback—which is wound round the carcass of the tyre, the two ends of the strip being brought into abutting contact. The camelback has a thick middle portion and tapers off at its side edges. After the camelback has been applied, thin strips of unvulcanised rubber may be adhesively secured round the peripheral side walls of the tyre in such a way as to overlap the thin side margins of the camelback. The material of the camelback is a composition comprising milled unvulcanised rubber containing the usual compounding ingredients together with the necessary quantity of a vulcanising agent. After application of the camelback (together with the thin side wall strips, where used) the tyre is assembled in a mould, having an inflatable tube core, and moulding and vulcanisation is effected.

The present invention provides a method for use in the remoulding of pneumatic tyres which is characterised by the direct application to a prepared tyre carcass of a camelback strip in hot tacky condition as it emerges from the extrusion head of a press employed for the production of the strip. For the purpose of the invention the starting material is a solid rubber product—conveniently in the form of about ⅜" thick sheets—comprising milled rubber containing the usual compounding ingredients, together with a vulcanising agent, which after softening by heat is subjected to extrusion through an appropriately shaped die to form a continuous strip constituting the camelback. In consequence of the direct application of the camelback in the tacky plastic condition in which it issues from the extrusion press, a better bond with the tyre carcass is obtained and in some cases the use of a vulcanising cement may be avoided.

The invention also provides apparatus for carrying out the above method and comprising the combination with a press (e.g. of the plunger-and-cylinder type) adapted for the extrusion of the camelback composition, in a heat-softening condition, in strip form of required-cross-sectional shape and dimensions, of a device located adjacent to the extrusion head of the press and arranged to form a support on which the tyre may be so mounted (and rotated, as required) that the camelback issuing from the the extrusion head may be directly applied to the tyre carcass.

The apparatus according to the invention may also include a guide track for the camelback strip located between the extrusion head and the tyre mounting device.

Further preferred features of the invention are concerned with improvements in an extrusion press whereby it is particularly adapted for use in the general method and apparatus described above. According to one such feature, there is employed an extrusion press comprising a cylinder or like chamber adapted to receive a charge of the starting material, and having a head in which an extrusion die is located, and a ram or plunger movable in the cylinder in a direction towards the head to effect extrusion through the die and retractable to permit the insertion in the cylinder of a fresh charge, preferably the die-carrying head of the extrusion cylinder is formed as a hinged unit movable about its hinge from a closed operative position, to an open position in which the end of the cylinder is uncovered and loading of the cylinder is thereby permitted. According to a further preferred feature, the extrusion press employs a hollow ram or plunger within the bore of which is located a cylinder and double-acting piston device so arranged that the ram is rapidly brought close up to the position where extrusion begins, and is rapidly retracted after the extrusion is finished, by fluid pressure on the piston. A still further preferred feature of the invention relates to the provision of a "choke" for insertion in the extrusion cylinder or barrel, after loading of the charge, in order to ensure even distribution of the material over the whole area of the die and to compensate for differences in plasticity throughout the charge.

Figure 4:
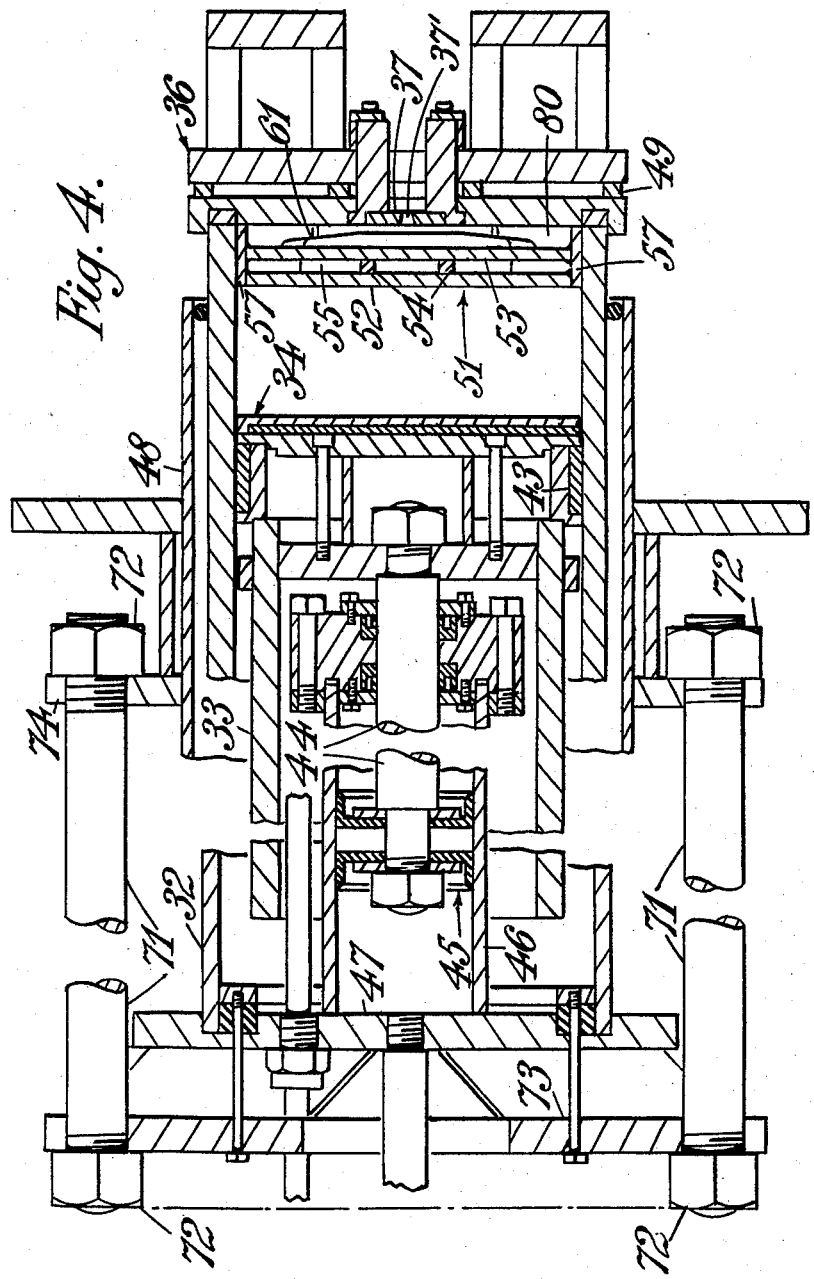
Figure 5:
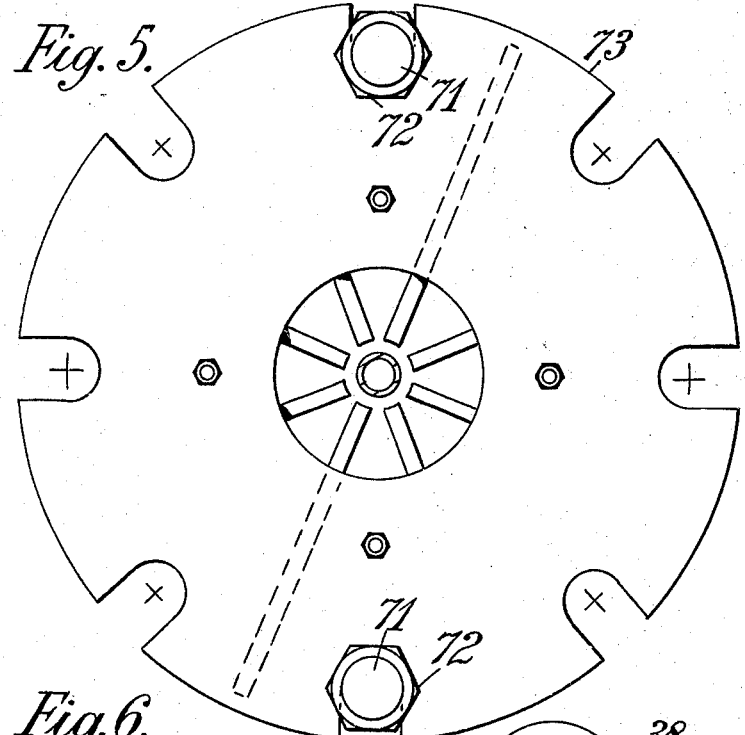
Figure 6:
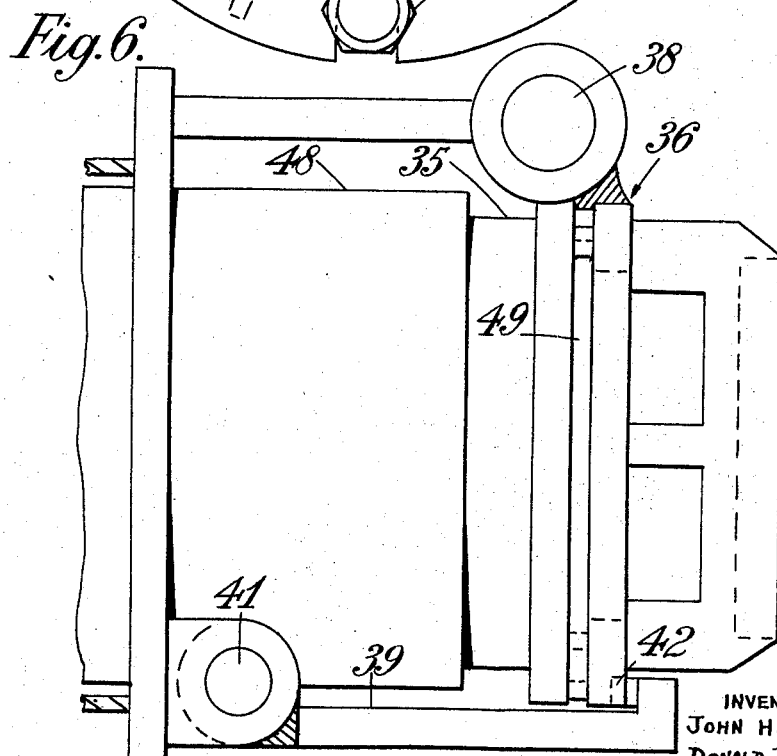
Figure 7:
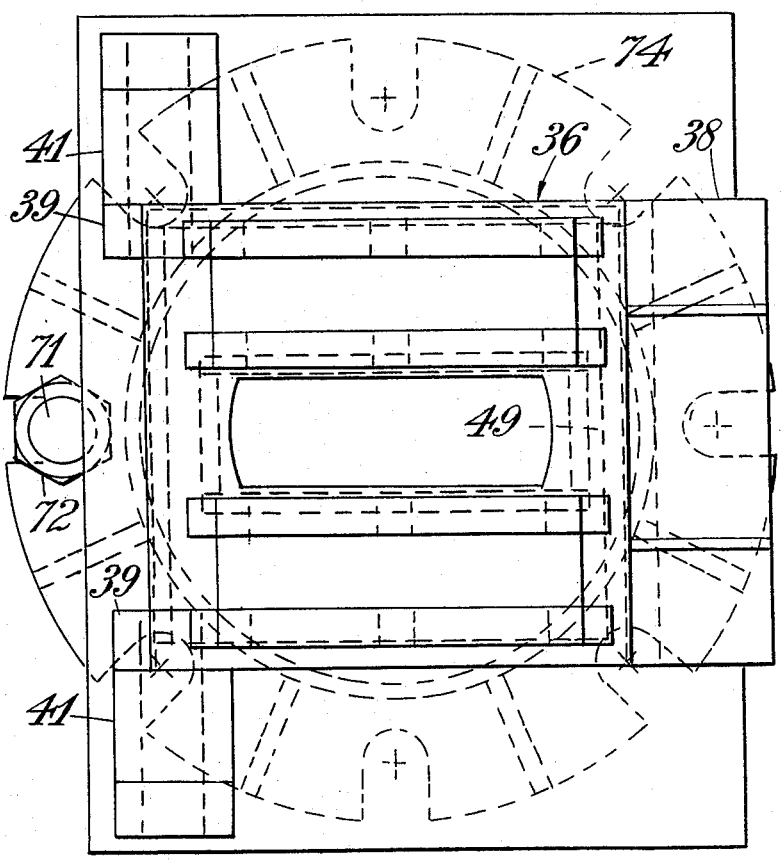

An example of an apparatus and method embodying the foregoing and other features of the invention will now be described with reference to the accompanying drawings, in which:

Figure 1 is a side view of the apparatus being employed for extruding camelback and applying it directly to a prepared tyre carcass, Figure 2 is a perspective view of the double-sided guide track for the camelback strip, Figure 3 is a longitudinal vertical sectioned view of the extrusion apparatus, Figure 4 shows, to a larger scale, some details of the view shown in Figure 3, Figure 5 is an end view of the extrusion apparatus from the end thereof remote from the die, Figure 6 is a plan view of the die end of the extrusion apparatus, Figure 7 is an end view of the extrusion apparatus from the die end thereof, but with the die omitted, Figure 8 is an elevation of the choke showing the face thereof which lies nearer to the die, Figures 9 and 10 are detail views of a part of one of the deflector bars of the choke, taken in the directions indicated by the arrows 9, 10 respectively of Figure 8, and Figure 11 is a sectional view of one of the deflector bars, taken on the line 11—11 of Figure 8.

In this example the apparatus comprises (Figure 1) extrusion apparatus 21, a guide track 22 for the extruded camelback 23, and a mounting device 24 for a tyre 25.

The tyre-mounting device 24 comprises two parallel horizontal rollers 26 slightly spaced apart and open for access at one end so that the tyre 25 may readily be passed end-on over the rollers and supported thereby with its beads bearing on the upper surfaces of the rollers. With this arrangement the tyre may be freely rotated by hand on its support 24.

The guide track 22 (Figure 2) comprises a horizontal "rack" of freely rotatable rollers 27 mounted on fixed axles 28 supported by a framework 29. The extruded camelback 23 in strip form is conveyed along, and supported by, the upper surfaces of the rollers 27. A second rack of freely rotatable rollers 31 is also provided for the purpose hereinafter mentioned.

The extrusion apparatus 21 comprises a horizontal cylinder 32 and ram 33 with the head 34 of the ram working in another cylinder 35 fitted with a head 36 carrying the extrusion die 37. The ram 33 is hydraulically operated by a power pump (not shown). The die-carrying head 36 is hinged at 38 (Figure 6) at one side of the cylinder so that the head 36 may be swung outwardly and to one side to give access to the bore of the cylinder 35. A locking arm 39 is pivoted at 41 at the other side of the cylinder 35 so as to be movable into and out of position in which it engages at 42 the side of the die-carrying head 36 and locks it closed on the end of the cylinder 35 to function as a releasable latch means. The ram 33 is formed hollow as a sleeve having its head 34 bearing, through a replaceable packing ring 43, on the inner surface of the extrusion cylinder 35. Within the cavity in the ram 33, and fixed to the head 34 of the ram, is a piston rod 44 carrying a double-acting piston 45 working in a cylinder 46 which extends into the cavity of the ram 33 and which is fixed to the end plate 47 of the hydraulic cylinder 32. The extrusion cylinder 35 and the die-carrying head 36 are jacketed at 48, 49 so that they may be heated by steam or water to maintain the charge in the extrusion cylinder at the proper degree of plasticity. The die-carrying head 36 of the extrusion cylinder is so arranged as to allow the ready removal and interchange of the extrusion die to suit the shape and dimensions of the camelback under production.

In order to ensure even flow over the whole die area, a disc-like choke 51 is provided for insertion in the outer end of the extrusion cylinder, to the position shown, after the charge has been loaded, the choke 51 being held in place by the hinged die-carrying head 36 when closed.

The choke 51 comprises two plates 52, 53 welded to stay bars 54, 55, which lie between the plates 52, 53 and to arcuate rim plates 57. The rim plates 57 are an easy fit in the extrusion cylinder 35, and the plates 52, 53 are cut away at 58, 59 to provide flow channels for the rubber compound. The flow is further controlled by two deflector bars 61 which are screwed on to the front face of the plate 53.

The axially projecting rim plates or means 57 abut axially against the die-carrying head and maintain the relatively opposed radial faces of the said head and the choke in axially spaced relation to define therebetween a space 80 (Figure 4) through which the plastic camelback material is urged radially inwardly from opposite directions to the extrusion aperture 37 of the die. Aperture 37' is, of course, spaced radially inwardly from flow channels 58 and 59.

The cylinders and other parts of the extrusion apparatus are held together by rods 71, having nuts 72 threaded thereon, engaging with plates 73, 74, 75, 76, 77.

In operating the apparatus, the starting material (i.e. in the form of rough sheets of material comprising milled unvulcanised rubber containing the usual compounding ingredients together with the necessary quantity of a vulcanising agent) is first softened by heating in an external chamber (steam or water heated) (not shown) and is then charged into the extrusion cylinder 35, the die-carrying head 36 having previously been opened and the ram 33 retracted. The choke 51 is inserted and the die-carrying head 36 is then closed and secured in its closed position by the hinged locking arm 39. The pressure of the power pump is then applied to the double-acting piston 45 to bring the ram 33 rapidly up to the material in the extrusion cylinder. When this point is reached, the fluid pressure is diverted to the ram 33 itself to effect the extrusion. After completion of the extrusion the ram 33 is rapidly retracted by fluid pressure on the piston 45 and the hinged head 36 of the cylinder 35 is opened in readiness for a fresh charge.

Varying the pressure on these rubber compounds while it is being extruded, varies the speed at which it emerges from the die and also the thickness of the extrusion since rubber compounds swell considerably immediately on leaving the extrusion die, and the quicker they pass through the die the more they swell. The thickness of the extruded camelback 23 may therefore be controlled, within limits, by varying the pressure on the ram 33 and for the purpose of obtaining such a control, the power pump may be furnished with an appropriate pressure control valve. For use in conjunction with this pressure control, a thickness indicator may be associated with the extrusion head.

The camelback strip 23 issuing from the extrusion apparatus 21 passes over the guide track 22 and is supported thereby. The end 62 of the camelback strip 23 is applied to the tyre carcass 25 and the latter rotated in order to wind on the strip 23. When the necessary length (i.e. to encircle the carcass) has been wound on, the strip is severed and the covered tyre is removed from the mounting device 24 and taken to another machine (not shown) where the camelback is rolled down under pressure. Alternatively, the apparatus may embody means whereby the pressure rolling of the strip is effected simultaneously (or nearly so) with its application to the tyre. The individual rollers of the guide track 22 are conveniently spaced apart so that the strip may be festooned between them, as shown at 63, when desired, e.g. to compensate for the difference in the rate of building up the tyre and that of extruding the strip, and in particular during the periods when a covered tyre is being removed from the mounting 24 and the next carcass assembled thereon. The second rack of rollers 31 is provided so that should it be required to have an extrusion off the machine which is not to be applied directly to tyres, this may be taken onto the rollers 31, festooned between them and allowed to remain there to cool.

Because of the high degree of plasticity of the camelback as it is extruded little rolling or "stitching" is required to make it adhere to the cemented tyre carcass when it is applied thereto in hot tacky condition as extruded, and in some cases the cement may be dispensed with altogether.

The invention is not restricted to the details of the foregoing example. For instance, the choke may take various alternative forms. In one, it comprises a built up cylindrical member providing a tapering channel leading to the die, this channel being cylindrical at its inlet and gradually debouching into a rectangular slot at the die. In the region of this slot a crescent-shaped plate is arranged to define the channel outlet in conformity with the shape of the die passage. In another form, the choke is a ring member adapted to make a close fit within the extrusion cylinder and formed internally to constrain the rubber compound, in its passage to the die, and to follow a confined offset to one side of the barrel. In a still further arrangement, the choke is adapted to confine the rubber flow to an annular channel leading to the die.

We claim:

1. An extrusion press for plastic material comprising an extrusion cylinder of uniform internal diameter open at one axial end for reception of the plastic material, a piston disposed for axial movement within said cylinder and means actuating said piston to urge same toward said open end, to apply an axial extrusion force to the plastic material to move said material toward said open end, and to retract it from said open end to permit insertion of a charge of material into said end to be extruded, a diecarrying head disposed for movement to and from closing relation across said open end, a die removably carried by said head and, in the closed position of said head, defining an extrusion aperture located on the axis of said cylinder and spaced radially inwardly from the interior wall of said cylinder, a disc-like choke disposed between the piston and said open end for axial insertion into and withdrawal from the cylinder through said open end, said choke being axially slidable within the cylinder whereby the axial extrusion force transmitted through said material will urge the choke axially toward said die carrying head, means interposed between said head and said choke and axially movable with said choke for maintaining between the choke and the die carrying head a space of predetermined axial extent for the flow of said plastic material, said choke being formed around its outer periphery with a pair of diametrically opposed symmetrically arranged openings located radially outwardly from said extrusion aperture and defining a plurality of axial flow passages extending axially completely through said choke and through which the plastic material, under said extrusion force, is caused to flow axially through said channels to said space, thence radially inwardly through said space to said extrusion aperture, the openings of said pair being of equal area.

2. The combination as defined in claim 1, wherein said means interposed between the head and the choke is carried by the choke, said head being hingedly mounted on the cylinder for swinging movement to and from its closing relation across said open end of the cylinder, and latch means carried by the cylinder and said head for firmly securing the head in its said closing relation.

References Cited in the file of this patent

UNITED STATES PATENTS

| | | |
|---|---|---|
| 1,682,876 | Weisse | Sept. 4, 1928 |
| 1,913,330 | Brickman | June 6, 1933 |
| 2,213,028 | Kraft | Aug. 27, 1940 |
| 2,327,227 | Tucker | Aug. 17, 1943 |
| 2,405,802 | Taber | Aug. 13, 1946 |
| 2,420,405 | Alves | May 13, 1947 |
| 2,428,315 | Lester | Sept. 30, 1947 |
| 2,449,625 | Stuart | Sept. 21, 1948 |
| 2,474,511 | Bacon | June 28, 1949 |
| 2,490,625 | Hall | Dec. 6, 1949 |
| 2,560,022 | Formaz | July 10, 1951 |
| 2,672,914 | Weigold et al. | Mar. 23, 1954 |
| 2,693,007 | Rhodes | Nov. 2, 1954 |
| 2,696,640 | Wienand | Dec. 14, 1954 |
| 2,734,553 | Rawls | Feb. 14, 1956 |
| 2,744,849 | Andy et al. | May 8, 1956 |
| 2,773,283 | Malamoud et al. | Dec. 11, 1956 |
| 2,805,447 | Voges | Sept. 10, 1957 |

FOREIGN PATENTS

| | | |
|---|---|---|
| 624,699 | Great Britain | June 15, 1949 |